S. A. EMMONS.
DREDGE.
APPLICATION FILED FEB. 3, 1915.
1,168,293.
Patented Jan. 18, 1916.
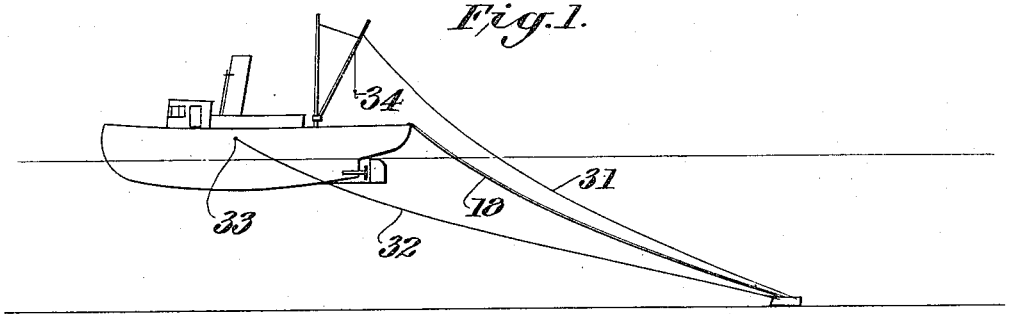
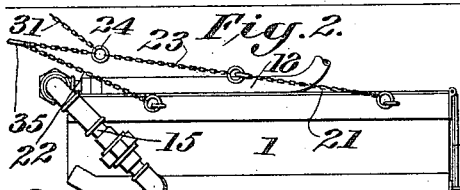
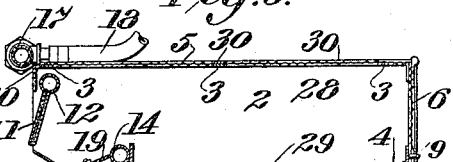
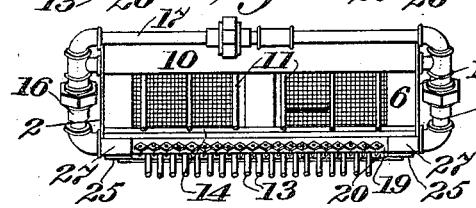
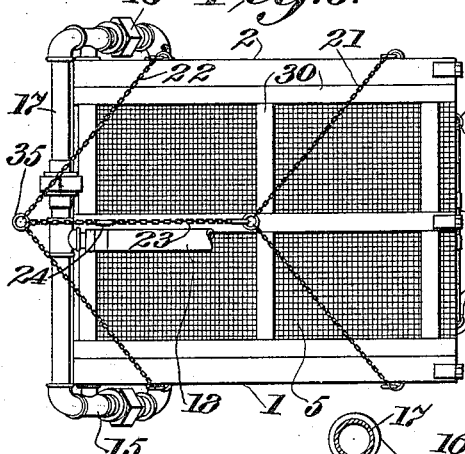
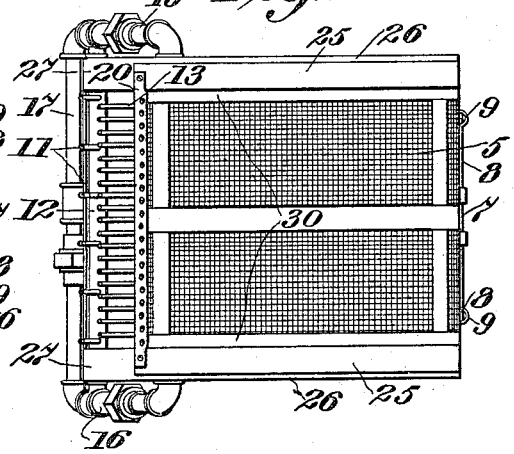

UNITED STATES PATENT OFFICE.

STEPHEN A. EMMONS, OF BROOKLYN, NEW YORK.

DREDGE.

1,168,293.  Specification of Letters Patent.  Patented Jan. 18, 1916.

Application filed February 3, 1915. Serial No. 5,918.

*To all whom it may concern:*

Be it known that I, STEPHEN A. EMMONS, a citizen of the United States, residing in the borough of Brooklyn, in the county of Kings and State of New York, have invented a certain new and useful Improvement in Dredges, of which the following is a full, clear, and exact description.

This invention relates to dredges, and particularly dredges adapted to be dragged after a vessel for gathering shell-fish, such as oysters and clams, from sea or river bottoms and especially from sandy bottoms.

The object of the invention is to provide means for gathering shell-fish in a rapid and economical manner and in large quantities, and in such condition that they are practically free of sand or other soil or substance in or upon which they are found.

The invention consists of a dredge of cage-like structure, closed at top, bottom and sides and at one end, the other or front end being open and provided with sets of angularly disposed teeth or jet-tubes, some or all of which may be open at their outer ends and adapted to be supplied with water under pressure so that when the dredge is in operation the water will be discharged from said teeth or jet-tubes in streams in substantially intersecting planes, whereby the material of the sea or river bottom is displaced and this displaced material violently agitated and the shell-fish contained therein washed free of it and as the dredge is dragged forward deposited within the dredge, as I will proceed now to explain and finally claim.

In the accompanying drawings, illustrating the invention, in the several figures of which like parts are similarly designated, Figure 1 is a diagrammatic view showing one way of operating the dredge. Fig. 2 is a side elevation; Fig. 3 a longitudinal section; Fig. 4 a front elevation; Fig. 5 a rear elevation; Fig. 6 a top plan view and Fig. 7 a bottom plan view of the dredge. Fig. 8 is a view showing in detail the connection of the rake teeth with the pipes through which they are supplied with water.

The dredge comprises side members 1 and 2 connected at top and bottom by any suitable interior braces 3 and 4 respectively. The top and bottom of the dredge are covered with suitable netting 5. The rear end of the dredge is provided with a hinged gate or door 6 also covered with netting and this gate is secured by a double latch 7, the dogs 8 of which engage staples 9 secured to one of the braces 4. The front end of the dredge is open and has a forwardly extending overhanging top portion 10 and is provided with a series of downwardly projecting tubular teeth or jet-tubes 11 screw-threaded or otherwise secured in a pipe 12 supported at its ends in the side members 1 and 2 and located beneath the overhanging top portion 10. At the bottom of the dredge and located a slight distance back from the front end is a second series of teeth or jet-tubes 13 secured in a pipe 14 supported in the side members 1 and 2 in like manner as the pipe 12. These two pipes 12 and 14 are connected at opposite ends by pipes 15 and 16 through suitable couplings, and the pipes 15 and 16 are in turn connected with a pipe 17 to which water under pressure is supplied from a pump or other apparatus (not shown) through a flexible tube or hose 18. Some of the rake teeth or jet-tubes 13 may be plugged at their outlet ends if desired so that the material of the sea or river bottom will not be displaced to such an extent as to cause the dredge to bury itself.

Reinforcing strips 19 and 20 are placed respectively above and below the teeth or jet-tubes 13 and securely bolted or otherwise fixed to the frame of the dredge and they are also bolted together at intervals between the teeth so that when necessary they may be loosened and broken or bent teeth replaced.

The dredge is dragged by means of a chain or other harness composed of sections 21 and 22 secured to the side members 1 and 2 at front and rear and these sections are connected midway of their lengths by a section 23 having a connection 24 about midway of its length whereby the dredge may be raised in a substantially horizontal position. To the forward end of section 23 is fastened the dragging cable.

The bottom of the dredge is supplied with reinforcing shoes 25 secured to running pieces 26 which have their forward ends curved upward as at 27 so as to cause the dredge to ride over obstructions.

The wire mesh or netting 5 may be and is here shown as secured to the frame by clamping it between the braces and longitudinal members 28 and 29 by means of strips 30.

The operation of the device is as follows:—The dredge is lowered by means of a cable 31 connected with the section 23 at connection 24 and this cable is operated through any suitable means such as a derrick and engine on the vessel. A second or dragging cable 32 is connected with the dredge as hereinbefore set forth, and it is connected with the vessel by any suitable means such as an outrigger 33. When the dredge reaches the bottom the cable 31 is slacked and the cable 32 paid out until it assumes the required angle for the proper operation of the dredge and then it is made fast and the dredge is supplied with water under pressure through the hose 18 and is dragged along. The water supplied to the dredge passes through pipes 17, 16, 15, 12 and 14 to the teeth or jet-tubes 11 and 13 from which it discharges with great force and cuts up the material of the bottom and revolves it and the shell-fish contained in it in a direction opposite to the direction of motion of the dredge so that the shell-fish are cleaned and as the dredge is dragged forward by the boat are deposited within it. At proper intervals the dredge is raised by means of the cable 31, the cable 32 being at the same time taken in and when the dredge is swung in over the deck of the vessel its front end is raised by means of an extra cable and hook 34 which is adapted to engage the ring 35 at the forward end of section 23, and upon the gate or door 6 being opened the contents will be discharged.

I have shown only one dredge dragged by the vessel; but it is obvious that two or more may be dragged by adding the necessary operating mechanism for them.

Various details of construction and arrangements of parts are within the scope of the invention as set forth in the claims.

What I claim is:—

1. In a dredge, the combination with a cage-like body portion, of pipes provided with jet tubes to which water under pressure is supplied, said jet tubes being angularly disposed so that the streams issuing therefrom will intersect each other and give a revolving motion to the material dredged.

2. In a dredge, a body portion having an open end and a closed end, a pair of pipes arranged at top and bottom of said open end, sets of jet tubes which also act as rake teeth screwthreaded into said pipes, the lower set of said tubes being clamped between reinforcing strips so situated that if the tubes of said set are broken off sufficient of their length will be left by which they may be unscrewed and replaced, and means for supplying water under pressure to said tubes.

3. A dredge, having a cage-like body portion, a gate at one end, the other end of said body portion being open, jet tubes in said open end arranged to discharge streams of water in opposition to each other, and means to supply water under pressure to said jet tubes.

4. In a dredge, a cage-like body having a gate at one end and its other end open and provided at the top with a series of depending jet tubes, a series of jet tubes at the bottom of said opening arranged on a downward incline, and means to supply water under pressure to said tubes.

5. In a dredge, a cage-like body having a closed end and an open end, a series of jet tubes at the top of said open end arranged to discharge downwardly and another series of jet tubes at said open end arranged to discharge substantially forward, and means for supplying water under pressure to said tubes.

6. A dredge, having a cage-like body provided with an open end and a gated end arranged oppositely, water discharging jet tubes arranged at top and bottom of said open end to effect conflict between their emitted streams, and means to supply water under pressure to said tubes.

7. A dredge, having a cage-like body provided with an open end and a gated end arranged oppositely, water pipes arranged at top and bottom of said open end and having jet tubes for discharging the water, said tubes inclined downwardly from the top pipe and similar tubes of the bottom pipe extending forwardly of the body, and means to supply water under pressure to said tubes.

In testimony whereof I have hereunto set my hand this 21st day of January, A. D. 1915.

STEPHEN A. EMMONS.

Witnesses:
  JAS. H. BLACKWOOD,
  W. H. FINCKEL, Jr.